Wiggin & Hoard,
Steam Trap,
N°32,492. Patented June 4, 1861.
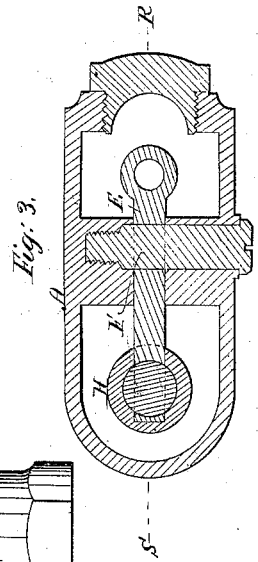
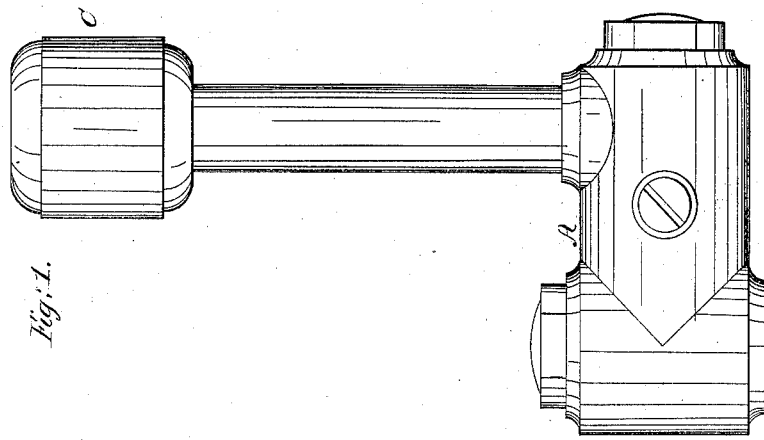
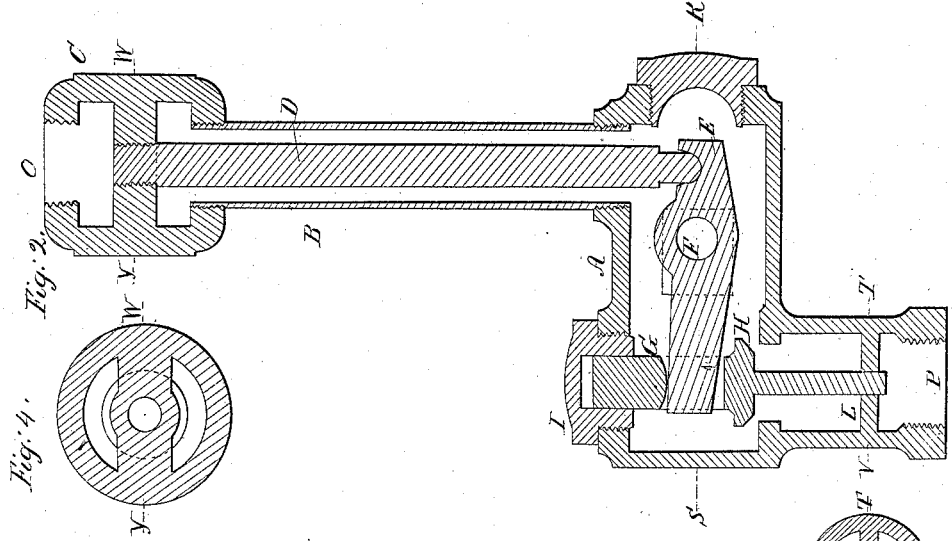
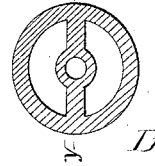
Witnesses;
Henry Martin
Albert M. Hewitt
Inventor;
George B. Wiggin
John W. Hoard

UNITED STATES PATENT OFFICE.

GEO. B. WIGGIN AND JNO. W. HOARD, OF PROVIDENCE, RHODE ISLAND.

STEAM-TRAP.

Specification of Letters Patent No. 32,492, dated June 4, 1861.

*To all whom it may concern:*

Be it known that we, GEORGE B. WIGGIN and JOHN W. HOARD, of the city and county of Providence and State of Rhode Island, have invented a new and Improved Steam-Trap Valve; and we do hereby declare that the following is a full, clear, and exact description of the same, reference being had to the accompanying drawings, representing the same and making part of this specification, in which—

Figure 1 is a perspective view. Fig. 2 represents a section of Fig. 1. Fig. 3 is a section on line S. R of Fig. 2. Fig. 4 is a section on line Y. W. of Fig. 2. Fig. 5 is a section on line V. T. of Fig. 2, same letters referring to like parts on the sections.

This invention consists in a certain combination with the outer case or chamber A of a brass or other metal pipe—coupling—rod—lever—valve—valve spindle guides—inlet and outlet.

To enable others to make and use our invention we will proceed to describe its construction and operation.

A represents the outer case.

B is an expanding brass or other metal pipe, which is attached to A and coupling C.

D is a steel or other metal rod, one end of which is attached to a cross-bar in coupling C, and the other end stepped into the short end of lever E.

E is a lever which works on fulcrum F, and extends through the valve spindle G.

H is the valve.

I and L are guides for valve spindle G.

O is the inlet and P the outlet.

The operation is as follows, when the steam from the boiler first enters the steam pipes the cool surfaces of the pipes cause a considerable amount of condensation and the water of condensation in the descending pipes entering pipe B at O and passing through B and A, escapes through the opening of valve H, which is now represented as being open, and which continues so as long as there is sufficient water of condensation to fill pipe B, but as soon as the pipes become heated sufficiently to prevent condensation the steam reaching pipe B heats it and causes it to expand in a large excess over rod D and as the upper end of rod D is likewise attached to coupling C, the elongation of B lifts rod D from the end of lever E and permits the pressure to close valve H, and thus prevent the escape of steam. When steam is no longer generated in the boiler or when at any time condensation takes place in the pipes the water of condensation reaches and fills pipe B, which cools it and causes it to contract and in doing so forces rod D down on the end of lever E and thereby raises valve H from its seat and permits the escape of the water.

One fatal fault heretofore in the use of metal expansion for steam traps has been the omission to provide for any difference of expansion caused by a greater or less pressure—for instance—if the pressure is more at one hour than another the heat also is more, consequently the expansion is greater, and if expansion at the greatest pressure is only sufficient to close the valve at a less pressure it will leak steam—or if the expansion at the least pressure is amply sufficient to close the valve then an increase of expansion must destroy it. We claim to have effectually overcome this fatal objection by making use of the expansion of pipe B in connection with rod D to permit the pressure to close the valve and the contraction to open it.

Heretofore the expansion of a pipe or rod has been used directly to close a valve the elongation of which pipe being so slight gives too little opening, permitting it soon to get filled up and clogged, whereas by our arrangement, of the lever we can give any desirable opening to the valve and thus overcome another most serious objection.

It will be observed as a vital point in connection with this trap that as pipe B elongates by expansion it lifts rod D from the end of lever E and permits the pressure to close the valve. The expansion of the pipe may continue without injury. As pipe B contracts it forces rod D down on the lever and opens the valve to permit the escape of the water thus it will be seen that no variation of expansion can possibly put the trap out of order.

What we claim as our invention and desire to secure by Letters Patent is—

1. The combination with the outer case or chamber A of a brass or other metal pipe B, coupling C, steel or other metal rod D, lever E, valve H, valve spindle guides I and L, inlet and outlet O and P, constructed and operating as described for the purpose set forth.

2. The contraction of the brass or other metal pipe B, in combination with the inner rod D, and lever E, to open the valve H, and the expansion of said pipe to liberate lever E, and permit the pressure of steam to close it in the manner and for the purpose set forth as described.

March 18, 1861.

GEORGE B. WIGGIN.
JOHN W. HOARD.

In presence of—
 HENRY MARTIN,
 ALBERT M. HEWITT.